Nov. 8, 1966  A. J. BELANGER  3,284,051

CHAIN HOISTING MECHANISM

Filed May 28, 1965  2 Sheets-Sheet 1

INVENTOR.
ARTHUR J. BELANGER
BY
*Price & Heneveld*
ATTORNEYS

Nov. 8, 1966   A. J. BELANGER   3,284,051
CHAIN HOISTING MECHANISM
Filed May 28, 1965   2 Sheets-Sheet 2

INVENTOR.
ARTHUR J. BELANGER
BY
ATTORNEYS

United States Patent Office 3,284,051
Patented Nov. 8, 1966

3,284,051
CHAIN HOISTING MECHANISM
Arthur J. Belanger, 3216 Sanford St., Muskegon, Mich.
Filed May 28, 1965, Ser. No. 459,690
7 Claims. (Cl. 254—105)

This invention relates to hoist apparatus, and particularly to roller chain hoisting apparatus useful as a vehicle jack or otherwise.

This application is directed to an improvement on my basic structure disclosed and claimed in my Patent No. 3,159,382 issued December 1, 1964.

The hoist in my prior patent is very advantageous because of several reasons, including the strength and versatility obtainable from a flexible roller chain, the reversible action of the hoist, and others. The present construction has been devised in efforts to simplify the overall construction of the hoist, to lower the cost of manufacturing the same, and to achieve even more control over the operation of the roller chain hoist, in forward and reverse directions.

It is therefore an object of this invention to provide a roller chain hoist having relatively inexpensive construction capable of mass production at reasonable cost, yet taking advantage of the strength and versatility of a roller chain.

Another object of this invention is to provide a roller chain hoist achieving excellent reversing action for lowering of the load, and allowing exact control of forward and reverse actions.

Another object of this invention is to provide a roller chain hoist that eliminates the need for a chain sprocket, but rather allows the use of a simple roller while providing complete control of the unit, in forward and reverse actions.

Another object of this invention is to provide a roller chain hoist that eliminates the possibility of accidental load lowering in uncontrolled manner, or of accidental lowering of the load a small amount during hoisting action. With the novel apparatus, the handle actuator can be shifted between stops for raising or lowering, with resulting step by step chain movement occurring automatically in the desired direction.

These and several other objects of this invention will become apparent upon studying the following specification in conjunction with the drawings in which.

Figure 6:
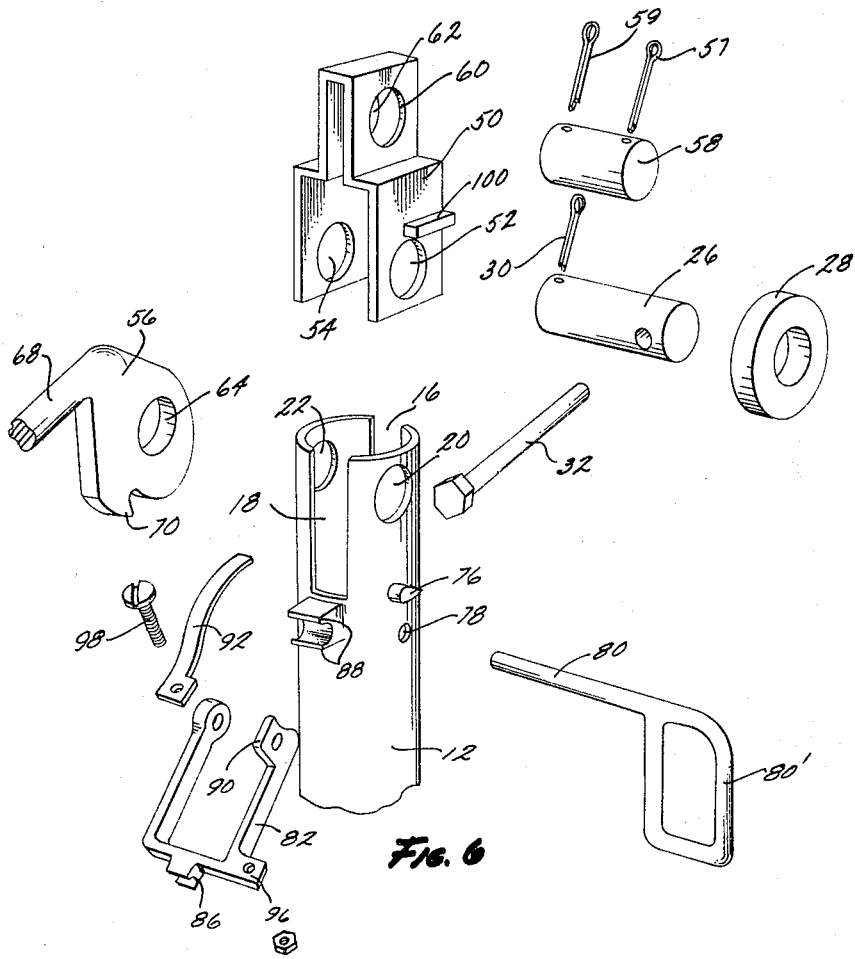
FIG. 6 is a perspective exploded view of the upper end of the assembly.

Referring now specifically to the drawings, the hoist assembly 10 includes a vertical support post 12 which may rest on a suitable stand 14 (FIG. 3) on its lower end. This post is basically a hollow pipe-like element. The upper end of the hollow post is slotted transversely to form the opposite horizontally spaced, vertically extending slots 16 and 18 in the walls (FIG. 6). Transverse to this slot area in the post, on an axis at a 90° angle to the plane of the slots, is a pair of horizontally aligned orifices 20 and 22 to receive a pivotal axle pin 26. It extends through these two orifices 20 and 22, and mounts in the center thereof a rotatable annular wheel 28. The pin is retained in position on the post by a suitable cotter key 30 on one end, and an elongated stud 32 on the other end, both of which extend transversely through axle openings. Rotatable roller 28, having a smooth cylindrical outer surface, is aligned with slots 16 and 18 in the post so that roller chain 36 can extend generally into the slots, and up and over the roller, to ride thereon.

Figure 7:
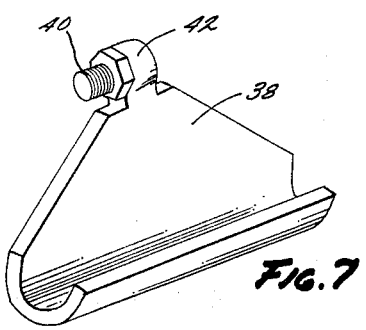
FIG. 7 is a perspective view of the load engaging hook preferred for this hoist.

The load receiving hoisting end of chain 36 has a hook 38 (FIGS. 4 and 7) mounted thereon as by suitable stud means 40. This hook has a wide configuration, with an annular collar 42 on the upper end to fit in place of the last roller on the last link of the roller chain. The opposite end of the roller chain may be suitably positioned out of the way, as through an opening 44 (FIG. 1) into the base of the hollow post for convenient storage.

Axle pin 26 not only mounts roller 28, but also pivotally mounts a bracket 50 by extending through the spaced horizontally aligned openings 52 and 54 in the depending parallel legs of the bracket. This bracket includes an upper cross portion and this pair of downwardly depending legs. The lower, outwardly extending, widely spaced portions of the legs fit astraddle the upper end of post 12, and an upper more closely spaced portions fit closely astraddle the much narrower chain shifting means 56. This chain shifting means is retained pivotally between the legs of bracket 50 by a second axle pin 58 extending through openings 60 and 62 in the legs of the bracket, and through an aligned opening 64 in the body portion of this oscillatable eccentric operator 56. Pivot pin 58 is retained in position by a suitable pair of cotter keys 57 and 59 extending through suitable openings in the opposite ends of the pin.

Integral with and extending radially from the body of this element 56 is a handle lever 68. Also integral with it is a slightly curved, downwardly extending tooth type tang 70 of a configuration to fit between adjacent rollers of the roller chain. The handle, tang, and body of this chain shifting element are together pivotal with respect to the bracket both (1) independently thereof, or (2) when the tang is engaged between the rollers of the roller chain, together with the bracket.

Mounted to the outer surface of support post 12, just below and immediately adjacent the lower edge of one leg of bracket 50 adjacent the corner thereof closest to handle 68, is a fixed stop abutment 76. Beneath this abutment is a pair of horizontally aligned orifices 78 in the post walls, through which a cross pin 80 extends. The opposite ends of this cross pin serve as a pivotal mount for a U-shaped chain shifting cam element 82 (FIG. 6). One end of this pin preferably has an enlarged loop 80' formed thereon for purposes to be explained hereinafter.

Figure 2:
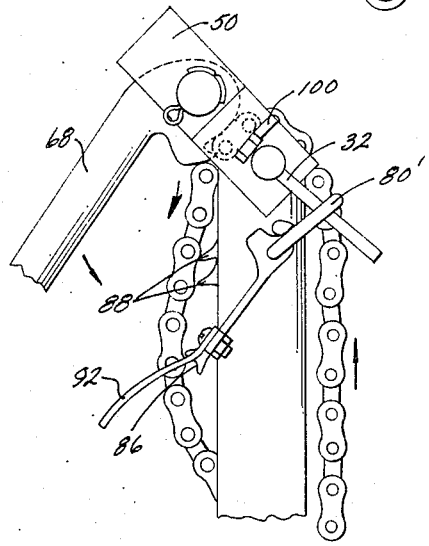
FIG. 2 is a side elevational view of the apparatus in FIG. 1, showing the position of the elements during the lowering of the handle for load hoisting.

This U-shaped element 82 extends around one half of the post, and normally lays diagonally downwardly against the post as shown in FIG. 2. On the outer face of its cross leg it has a concave, roller engaging, shallow mouth 86 aligned with the roller chain and with slots 16 and 18. It is also aligned with a pair of vertically spaced, upper and lower, radially outwardly extending catch teeth 88 which project from the post, and are fixed integral therewith immediately below slot 18. These are spaced sufficiently to receive one roller of the roller chain therebetween and to receive one roller beneath the lower tang. They curve slightly downwardly (FIG. 4) to serve as a catch for the chain to hold it in a particular position when a load is applied to hook 38.

The cam chain shifter 82 moves in an arc outwardly from the post and then outwardly and upwardly to push the chain out around this catch means to release it temporarily from the catch (as element 82 is shifted from its diagonally downward position to a position approaching the horizontal position).

Figure 1:
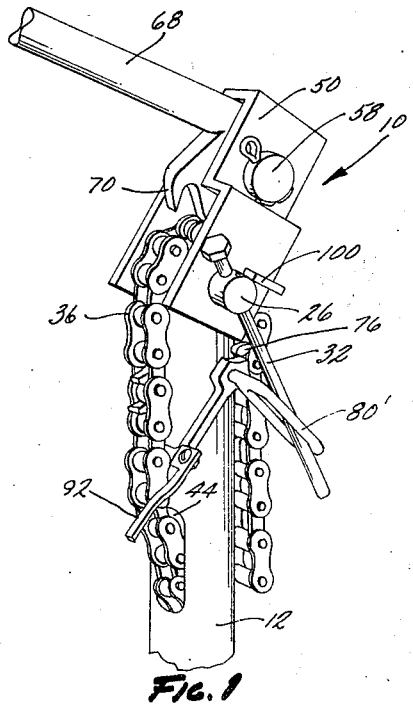
FIG. 1 is a fragmentary perspective view of the roller chain hoist, showing the apparatus as used for elevating, just prior to downward movement of the handle.

Adjacent the pivotal mounting of one leg of the U-shaped element 82 is an upward protrusion 90 which forms a fulcrum for a second control element 92 between the ends of this latter element. One end of element 92 is affixed pivotally to an extending ear 96 of outer cross leg of element 82 by a suitable bolted connection 98. The opposite end of element 92 therefore can be pivotally laterally shifted from one position between stop 76 and the lower edge of bracket 50, adjacent fulcrum 90, (FIG. 4), to a second inactive position away from the fulcrum and bracket as shown in FIGS. 1 and 2. This element controls selective forward and reverse actions of the hoist.

Figure 4:
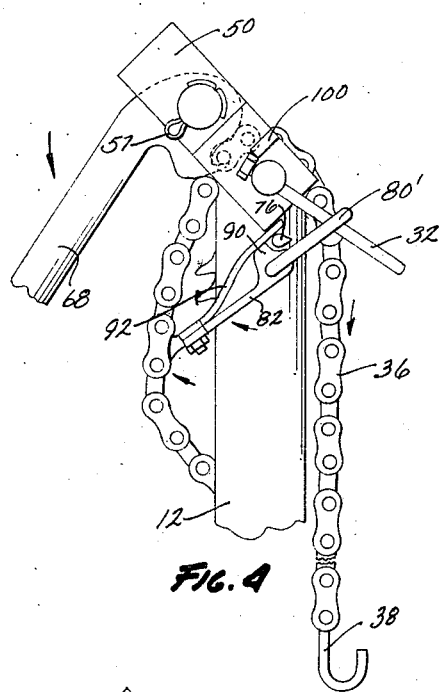
FIG. 4 is a side elevational view of the assembly in FIG. 3, showing the position of the elements during release of a segment of a chain for incremental lowering of the load.

Preferably, the elongated stud pin 32 extending through axle pin 26 has its lower end projecting down through the enlarged loop 80′. Also, an integral rigid stop 100 is provided on bracket 50 immediately adjacent the upper enlarged head of this stud pin 32 to abut it. Engagement of stop 100 with the head on this pin, and with the lower end of this pin on the end of enlarged loop 80′ limits downward movement of handle 68 as shown in FIGS. 2 and 4. It will be understood from the description of the operation hereinafter that these last elements are not essential to the combination, but are preferred due to the added movement limit control they provide over the hoisting mechanism.

Operation

Figure 5:
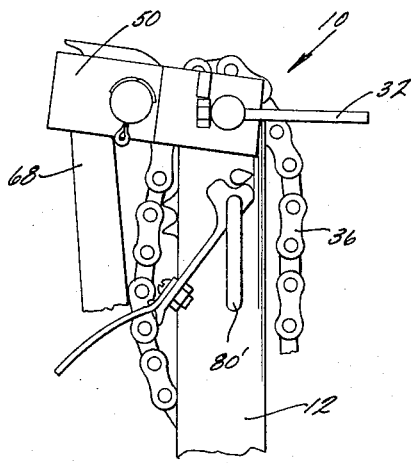
FIG. 5 is a side elevational view of the apparatus in its compact storage condition.

During periods of non-usage, the apparatus is maintained in a generally compact position like that illustrated at FIG. 5 by pushing the stud pin 32 up out of loop 80′, so that bracket 50 can be swiveled to its generally horizontal position, allowing handle 68 to extend down alongside post 12 in the manner illustrated.

When the jack or hoist is to be used to hoist a vehicle, or some other structure, pin 32 is extended through this loop 80′. Hook 38 on the hoisting end of roller chain 36 is placed beneath the vehicle bumper or other structure to be hoisted, and handle 68 is lifted to its generally upwardly diagonal position shown in FIG. 1, ready for the first hoisting step. The hoisting action of the mechanism is shown in FIGS. 1 and 2.

More specifically, with the mechanism in position as illustrated in FIG. 1, the handle being raised, and hoisting control element 92 being out from between element 82 and bracket 59, tang 70 is placed between two of the rollers of the roller chain by downwardly pivoting handle 68, element 56, and tang 70 on pivot pin 58. When the tang is thus engaged, the handle is continued to be depressed (FIG. 2), causing the handle, tang, bracket 50, and roller chain 36 to all be shifted to push the chain downwardly on the side of the handle, and pull it upwardly on the opposite side containing hook 38. The chain rolls over roller wheel 28 in so doing. The limit of this movement is obtained when stop 100 abuts the enlarged head on stud pin 32, and the lower end of this stud pin hits the outer end of enlarged loop 80′. When this position is obtained, the chain has moved past double catch 88 so that a new roller is between and under these catch protrusions. With the chain firmly held, handle 68 can again be hoisted to the position illustrated in FIG. 1 to disengage tang 70 from the rollers and reengage it at a different spot on the chain for the next oscillation.

Figure 3:
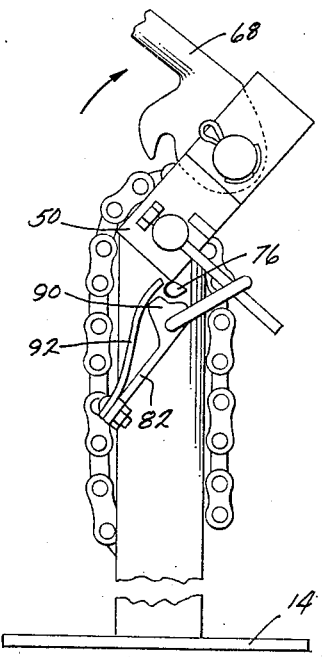
FIG. 3 is a side elevational view of the apparatus, showing the position of the elements with the jack handle raised just prior to incremental lowering of the load.

When the structure is operated to lower a load on hook 38, it is moved through the sequence of operations shown in FIGS. 4 and 3. Specifically, element 92 is now pivoted on its mount to place its free end immediately adjacent abutment 76, below the lower edge of bracket 50, and having a portion between its ends in engagement with fulcrum protrusion 90 on element 82. The handle is then lowered as in FIG. 4, so that the lower edge of bracket 50 hits against the free end of element 92, causing the opposite end of element 92 and of element 82 to shift outwardly into engagement with one of the rollers which is received by mouth 86. Slightly further lowering of the handle pushes member 82 and the chain out from engagement with catch 88, allowing the load on hook 38 to pull the roller chain in the reverse direction one step around the roller. Downward movement of the handle is limited by engagement of the free end of element 92 with fixed abutment 76, i.e. between abutment 76 and the lower edge of bracket 50. After the roller chain is moved a small amount by the load, it pulls free from the shallow mouth 86 of element 82, thereby allowing element 82 to drop back into engagement with the post, out of engagement with the chain. The chain then snaps back into engagement with catch 88 but at a slightly different position. This action is then repeated by hoisting the handle slightly to engage tang 70 between another pair of rollers, and depressing the handle to repeat the reaction just described.

It will be noted that complete control can be had over the structure at all times. During hoisting action, accidental reversing movement by pushing the handle too far in one direction or the other cannot occur. Reversing movement can occur only when control lever or spacer 92 is shifted into its active condition between the lower edge of bracket 50 and fulcrum 90 on element 82 adjacent stop 76. Various additional advantages of the structure will be apparent to those in the art upon studying the foregoing form of the structure. Therefore, the invention is intended to be limited only by the scope of the appended claims and the reasonably equivalent structures to those defined therein.

I claim:

1. A hoist mechanism comprising: a support having rotatable means thereon; a hoisting roller chain over said rotatable means; oscillating chain shifting means engageable with said roller chain and movable to advance said chain and to arrest the rate of its reverse movement; chain catch means on said support engageable between its rollers to hold said chain in a particular position; chain releaser means shiftably mounted on said support adjacent said catch means and adapted to temporarily release a section of roller chain from said catch means, and including releaser actuation control means shiftable between a first active position causing repeat actuation of said releaser means with oscillation of said chain shifting means, and another inactive position preventing such actuation.

2. A hoist mechanism comprising: a support; a roller mounted on said support; a hoisting roller chain looped up and over said roller to ride thereon; a chain shifter having a tang shiftable between rollers of said chain to positively engage said chain; a handle on said shifter; a bracket pivotally mounted to said support and pivotally mounting said shifter to allow said handle and tang to be moved independently of said bracket and to allow said tang, handle, bracket, and chain to be moved together with engagement of said tang with said chain; chain engaging catch means on said support to arrest chain movement under load; bracket actuated, chain releaser means shiftably mounted to said support adjacent said catch means to temporarily release said roller chain from said catch means, and including releaser actuation control means shiftable between a first position causing actuation of said releaser means by said bracket means and another position preventing such actuation.

3. The apparatus in claim 2 wherein said control means is a spacer element shiftable in said first position between the lower end of said bracket and the releaser, and shiftable from therebetween in another position.

4. The apparatus in claim 2 wherein said releaser includes a first element pivotally mounted to said support and a second element comprising said control means, the latter comprising a rockable lever attached on one end to said first element spaced from its pivot mount, and engageable on its other end with said bracket; said releaser including a fulcrum between the ends of said elements to pivot said first element by engagement of said bracket with said rockable lever, thereby shifting said first element into releasing relation to said chain and pushing said chain off said catch.

5. The apparatus in claim 4 including a fixed stop on said support adjacent said other end, opposite said bracket, to limit pivotal shifting of said elements.

6. A hoist mechanism comprising: a support; a roller mounted on said support; a hoisting roller chain looped up and over said roller to ride thereon; a chain shifter having a tang shiftable between rollers of said chain to positively engage said chain; a handle on said shifter; a bracket pivotally mounted to said support and pivotally mounting said shifter to allow said handle and tang to be moved independently of said bracket and to allow said tang, handle, bracket, and chain to be moved together with engagement of said tang with said chain; chain engaging catch means on said support to arrest chain movement; said catch means comprising a pair of upper and lower protrusions vertically spaced to receive a chain roller therebetween and a chain roller below said lower protrusion; bracket actuated, chain releaser means shiftably mounted to said support adjacent said catch means to temporarily release said roller chain from said catch means; said releaser means being configured to engage a roller of said chain and to release said roller after shifting it out around said protrusions to enable the next chain portion to engage said protrusions.

7. The apparatus in claim 2 including a transverse pin in said pivotal mounting of said bracket to said support, a pin shifting abutment on said bracket engaging one end of said pin, and an enlarged loop on said support receiving the second end of said pin; said abutment, pin, and loop being in binding engagement with lowering of said handle, to limit movement thereof.

References Cited by the Examiner

UNITED STATES PATENTS 910,231 1/1909 Rider _____ 254—146
3,159,382 12/1964 Belanger _____ 254—105

WILLIAM FELDMAN, *Primary Examiner.*

OTHELL M. SIMPSON, *Examiner.*